W. A. BRAINARD & H. M. MORTENSEN.
LAMP TURNING DEVICE.
APPLICATION FILED DEC. 23, 1916.
1,227,993.
Patented May 29, 1917.
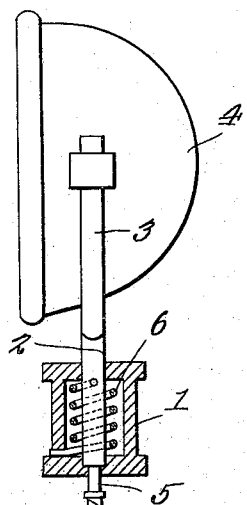
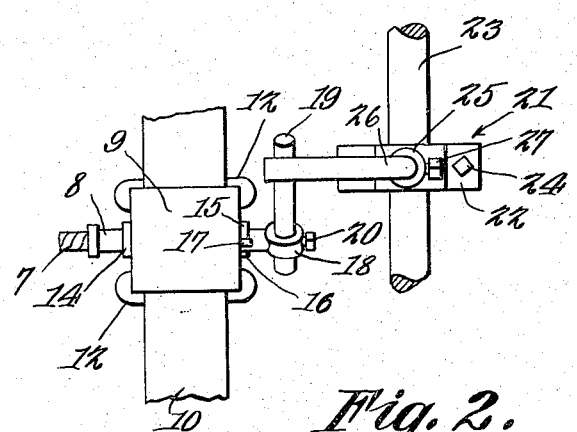
Fig. 2.
Fig. 1.
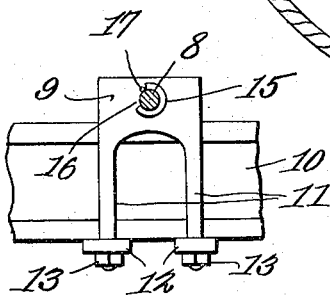
Fig. 3.
Witnesses
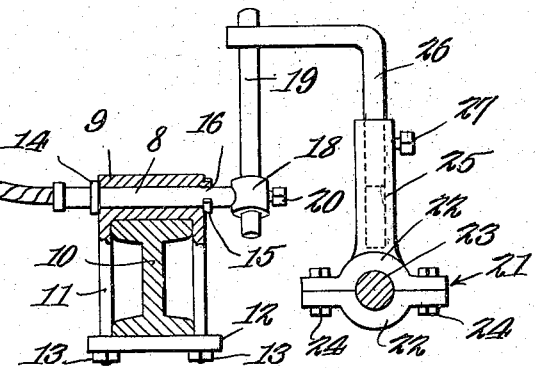
W. A. Brainard and
H. M. Mortensen Inventors.
by C. A. Snow & Co.
Attorneys.

UNITED STATES PATENT OFFICE.

WALTER A. BRAINARD AND HANS M. MORTENSEN, OF AUDUBON, IOWA.

LAMP-TURNING DEVICE.

1,227,993.  Specification of Letters Patent.  Patented May 29, 1917.

Application filed December 23, 1916. Serial No. 138,610.

*To all whom it may concern:*

Be it known that we, WALTER A. BRAINARD and HANS M. MORTENSEN, citizens of the United States, residing at Audubon, in the county of Audubon, State of Iowa, have invented a new and useful Lamp-Turning Device, of which the following is a specification.

The present invention appertains to dirigible lamps for automobiles and other vehicles, and it is the object of the invention to provide lamp turning means applicable to an automobile in a simple and convenient manner, and comprising a novel assemblage of the component elements.

A further object of the invention is the provision of a mechanism of the nature indicated which is of such construction that the lamp is only turned when the automobile is steered in one direction, right and left hand devices being used for the two headlights or lamps of an automobile, whereby one lamp will always direct its light straight ahead, while one lamp will be turned when turning corners, thereby affording effective illumination of the road ahead to avoid collision and accidents.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved mechanism, portions being shown in section.

Fig. 2 is a fragmental plan view.

Fig. 3 is a fragmental front view.

In carrying out the invention, there is provided a bearing 1 secured to the frame or other part of the automobile in any suitable manner and through which is journaled the vertical shank 2 of the lamp bracket 3 carrying the lamp 4. The lower end of the shank 2 seats upon the lower portion of the bearing 1 and has a reduced portion 5 protruding downwardly. The bearing 1 is hollow or has an opening in which a coiled wire torsional spring 6 is disposed, one end of said spring being secured to the bearing 1 and the other end to the shank 2, tending to turn the bracket 3 and lamp 4 in one direction.

A flexible shaft 7 of any suitable sort has one end secured to the reduced portion 5, and its other end is attached to a short horizontal shaft 8 journaled through a bearing 9 seated upon the front axle 10 of the automobile. Said bearing 9 has depending bolts 11 straddling the axle, and washer plates 12 are engaged upon the lower ends of said bolts as well as nuts 13 whereby to clamp the bearing 9 upon the axle. Collars 14 and 15 are secured upon the shaft 8 in any suitable manner and abut against the opposite ends of the bearing 9 to prevent longitudinal movement of the shaft 8 in its bearing.

In order to limit the movement of the bracket 3 and lamp 4 when turned in one direction by the spring 6 to a straight forward position, the collar 15 has an arcuate recess or cut away portion 16, and a stop lug 17 is carried by the corresponding end of the bearing 9 and projects within the recess 16, allowing the shaft 8 to oscillate. When the parts are turned under the influence of the spring 6 to move the lamp 4 to a straight forward position, the collar 15 strikes the stop lug 17 to prevent further movement of the parts, although they can move in the opposite direction a limited distance.

The rear end of the shaft 8 has a transversely arranged sleeve 18 through which an arm 19 is slidable transversely of the shaft 8, said arm 19 being held in any adjusted position by means of a set screw 20 carried by the sleeve 18.

A clamp 21 comprising sections 22 is adapted to embrace and clamp the steering rod 23 which connects the knuckles of the front wheels, as usual, the sections 22 being clamped together by means of bolts 24 or the like. One section 22 has an upstanding elongated tubular socket 25 slidably and rotatably receiving one arm of an L-shaped or angular tappet or member 26, said arm being secured in place within the socket 25 in various positions by means of a set screw 27 carried by said socket.

It is evident that after the light is applied to the automobile, the clamp 21 can be adjusted longitudinally and angularly upon the rod 23, the arm 19 can be adjusted longitudinally of itself in the sleeve 18, and the member 26 can be adjusted toward and away from the rod 23 and angularly within the socket 25, whereby the mechanism will operate properly. This enables the device to be adjusted for various automobiles and other conditions. Normally, when the automobile is moving straight ahead, the collar 15 rests against the stop lug 17 under the influence of the spring 6, so that the light from the lamp 4 will shine straight ahead. When the rod 23 is moved in one direction, away from the observer in Figs. 1 and 2, the free arm of the member 26 in contacting with the arm 19 will swing it, thereby turning the shafts 8 and 7, so that the bracket 3 is turned to direct the light toward the side toward which the vehicle is steered, the convenience of which will be apparent. When the rod 23 is returned to normal position, the spring 6 will rotate the bracket 3, shaft 7 and shaft 8 to return the parts to normal position as the member 26 is moved away from the arm 19. When the vehicle is steered toward the other side, the member 26 simply moves away from the arm 19 without turning the lamp 4. When two of the devices, one right hand and one left hand, are used with the two headlights or lamps of an automobile, it is evident that one lamp will always remain in "straight ahead" position, while the other lamp is turned when steering toward one side.

Having thus described the invention, what is claimed as new is:

1. A lamp turning device embodying a bearing, means for securing it upon the front axle of an automobile, a shaft journaled through said bearing, a lamp bracket connected to said shaft to be turned thereby, said shaft having a transverse sleeve, an arm adjustable in said sleeve, means for holding said arm in various adjustments in said sleeve, an angular member having one arm engageable with the aforesaid arm, and means for adjustably connecting the other arm of said angular member with the steering rod of the automobile steering gear.

2. In a lamp turning device, an oscillatory lamp bracket, a bearing attachable to the front axle of an automobile, a horizontal shaft journaled through said bearing, an arm carried by said shaft, a member attachable to a reciprocatory steering rod, an angular member having one arm engaged with said member for longitudinal and angular adjustments of itself, the other arm of said angular member being adapted to contact with the first mentioned arm, and means for holding said angular member in various adjusted positions relative to the first mentioned member, said shaft and bracket being operatively connected.

3. In a lamp turning device, an oscillatory lamp bracket, a bearing attachable to the front axle of an automobile, a shaft journaled in said bearing, a flexible connection between said shaft and bracket, an arm carried by said shaft, a clamp to embrace the steering rod of the automobile steering gear, said clamp having a tubular socket, an angular member having one arm slidably and rotatably adjustable in said socket and having its other arm adapted to contact with the first mentioned arm, and means for holding the first mentioned arm of said angular member in various adjusted positions in said socket.

In testimony that we claim the foregoing as our own, we have hereto affixed our signatures in the presence of two witnesses.

WALTER A. BRAINARD.
HANS M. MORTENSEN.

Witnesses:
V. M. JONES,
FRANK BAGLEY.

Copies of this patent may be obtained for five cents each, by addressing the "Commissioner of Patents, Washington, D. C."